United States Patent
French et al.

(10) Patent No.: US 6,284,294 B1
(45) Date of Patent: Sep. 4, 2001

(54) PATTERNED FROZEN CONFECTIONERY PRODUCT

(75) Inventors: William French, Dublin; Josephine E. Lometillo, Hilliard, both of OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/444,969

(22) Filed: Nov. 22, 1999

Related U.S. Application Data

(62) Division of application No. 09/027,575, filed on Feb. 23, 1998, now Pat. No. 6,004,606.

(51) Int. Cl.⁷ .................................................. A23G 9/04
(52) U.S. Cl. ........................ 426/100; 426/89; 426/90; 426/91; 426/101; 426/132; 426/134; 426/421; 426/512; 426/516; 426/518; 426/660
(58) Field of Search ..................... 426/89, 90, 91, 426/95, 100, 101, 132, 134, 512, 514, 516, 517, 518, 420, 565, 249, 421, 660

(56) References Cited

U.S. PATENT DOCUMENTS

| | | | |
|---|---|---|---|
| 2,207,616 | * 7/1940 | Howser | 426/249 |
| 2,217,700 | * 10/1940 | Musher | 426/101 X |
| 2,260,298 | * 10/1941 | Cowling | 426/249 |
| 2,284,651 | * 6/1942 | Gundlach et al. | 426/249 |
| 2,334,052 | * 11/1943 | Wedin | 426/249 |
| 2,344,901 | * 3/1944 | Routh | 426/249 X |
| 2,646,757 | * 7/1953 | Hackmann | 426/249 |
| 4,542,028 | 9/1985 | Butcher et al. | 426/100 |
| 4,971,816 | 11/1990 | Clark et al. | 426/101 |
| 5,135,767 | 8/1992 | Daouse | 426/515 |
| 5,283,070 | 2/1994 | Bertrand et al. | 426/249 |
| 5,556,653 | 9/1996 | Binley | 426/101 |
| 5,603,965 | 2/1997 | Daouse | 425/130 |
| 5,670,185 | 9/1997 | Heck et al. | 425/133.1 |
| 5,820,912 | * 10/1998 | Beckett et al. | 426/110 X |
| 6,004,606 | * 12/1999 | French et al. | 426/516 |

FOREIGN PATENT DOCUMENTS

| | | | |
|---|---|---|---|
| 0221757 | 5/1987 | (EP) | A23G/9/02 |
| 88/02990 | * 5/1988 | (WO) | 426/101 |

\* cited by examiner

*Primary Examiner*—Milton Cano
(74) *Attorney, Agent, or Firm*—Vogt & O'Donnell, LLP

(57) ABSTRACT

A patterned composite food product has an ice confectionery composition component and an edible material component which is different from the ice confectionery composition, the edible material having a pattern form which is an inclusion pattern zone in the ice confectionery composition, and the pattern may have a layer form wherein a plurality of edible material layers are separated one from another and surrounded by the ice confectionery composition. The composite product is prepared by pumping an ice confectionery composition into a former structure provided with an extrusion die for product extrusion from the former structure and by pumping a the edible material component through an assembly of a hollow spindle with nozzle(s) attached wherein the nozzle(s) is (are) provided with ports, particularly slots, for delivering the edible material to within the ice confectionery composition pumped through the former structure. The spindle of the assembly is located and extends longitudinally towards the die about an axis of the former structure within the ice confectionery stream, and the assembly rotates about the axis and also translates axially in a reciprocating movement so that patterns of the edible material are formed in the ice confectionery composition to provide a composite product having edible material inclusion zones and inclusion-free zones. The composite product so-pumped is extruded via the die to provide a strand which has a cross-section given by the die outlet opening and then the strand is cut to provide composite product portions.

23 Claims, 3 Drawing Sheets

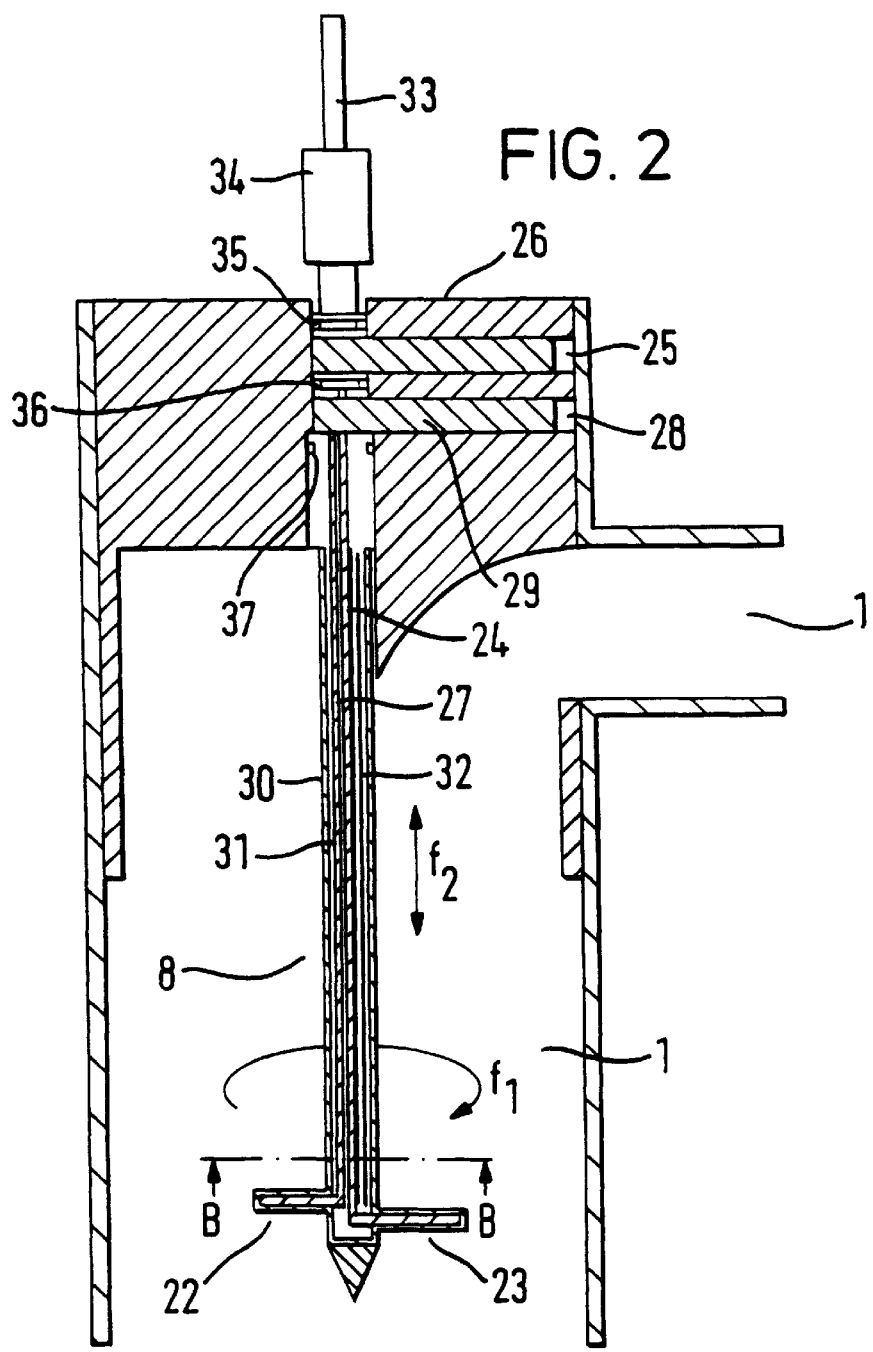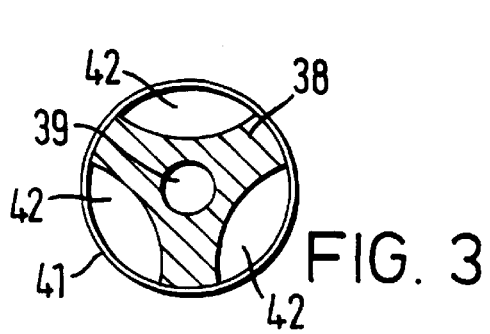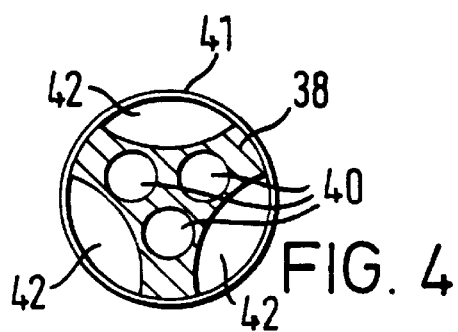

PATTERNED FROZEN CONFECTIONERY PRODUCT

CROSS-REFERENCE TO RELATED APPLICATION

This application is a divisional application of application Ser. No. 09/027,575 filed Feb. 23, 1998, now is U.S. Pat. No. 6,004,606.

BACKGROUND OF THE INVENTION

The present invention relates to multi-component, composite frozen confectionery products wherein the combined components provide a pattern.

Consumers have been offered articles of ice confectionery with new textures such as cakes or individual moulded portions such as cups or cones and the like containing inclusions of material of texture which is different from that of the body of aerated ice confection, e.g. crispy fat-based material.

European Patent Application Publication No. 0 221 757 an ice cream cone containing chocolate in the form of a plurality of flakes is produced by injecting chocolate into an extruded strand of ice cream provided with longitudinal grooves to form longitudinal thin strip-like chocolate layers in said ice cream strand, and the chocolate layers which solidify on contact with the ice cream break randomly into flakes when the strand is folded double to fill the cone wafer.

According to U.S. Pat. No. 5,135,767, to make a cup or cone having a flaky texture, superposed ribbons of ice cream and chocolate are extruded into a mold in the form of spirals by means of an extrusion assembly which comprises a flat extrusion tube and a spray tube and which receives a spinning movement resulting from an eccentric rotational movement and an ascending movement relative to the mold.

In U.S. Pat. No. 5,283,070, a layered cone is made by extruding an aerated ice cream into a vertically descending helix rotating about a vertical axis and having spaced flights which define passages between the helix, spraying chocolate into passages of the extruded helix and depositing the sprayed helix in a cone so that a layered product having alternating layers of ice cream and chocolate is formed.

In U.S. Pat. No. 4,542,028, composite ice confection cakes comprising a multiplicity of superimposed successive thin layers of ice cream separated by interleaved very thin chocolate layers are made by successively extruding ice cream ribbons through slotted extrusion outlets on a conveyor, spraying thin chocolate layers on the ice cream ribbons and cutting portions transversally to the multilayered strand.

In the prior art, layered confectionery products made by extrusion have thus been produced either by forming alternate layers of ice cream and chocolate within a mold which gives its shape to the article or by sequentially depositing thin ribbon-like ice cream layers and spraying chocolate between the layers on a conveyor and cutting the thus formed multiple layer strand with a vertical blade cutter through the product transversally to the inclusion layers, which gives limited shapes.

The known methods do not provide layered articles such as stick-bar and the like.

SUMMARY OF THE INVENTION

The objective of the invention is to produce coated frozen stick-bar and similar products with multiple thin patterns of an inclusion material of texture different from that of the aerated ice confectionery, for example of crispy texture such as fat-based or their inclusion ingredients, in a variety of well controlled shapes and orientations by extrusion. There are presently no products on the market, which satisfy this objective.

A secondary objective of the invention is to form the above-described patterning in a manner which permits transversal cutting with conventional hot wire cutters and transversal stick inserting. A further objective of the invention is to produce a variety of ice confectionery products requiring incorporation of one or more dissimilar patterns and with segmenting of the inclusion.

The frozen aerated confectionery product according to the invention comprises a bar which is cut transversally out of an extruded strand (e.g., a bar and referred to hereinafter principally solely as a "strand") of aerated ice confectionery, which is extruded through, and preferably vertically downward from, a die which gives its outer shape to the strand containing with inclusions consisting of multiple thin patterns of material of texture different from that of the aerated ice confectionery, particularly of crispy fat-based material, wherein the inclusions are disposed as distinct substantially parallel transversal patterns extending from the center of the strand to the periphery of the strand and are separated one from another by inclusion-free zones to allow for transversal cutting with conventional hot wire cutters.

The term "inclusion" means an additive introduced into the aerated ice confectionery material having geometry, texture, taste, color characteristics different from the ice confectionery material. The "inclusion-free" zones denote ice confectionery only.

In an embodiment, the product consists of a core of a patterned aerated confectionery, as above, sandwiched between two wafers or biscuits and which can be partially enrobed with a confectionery fat-based coating.

In another embodiment, the product consists of a stick-bar comprising a core of a patterned aerated confectionery, as above in which the stick is inserted transversally into an inclusion-free zone, which stick-bar can be enrobed with a confectionery fat-based coating.

The method according to the invention comprises pumping an extrudable ice confectionery composition into a former structure provided with an extrusion die so that the composition contained within the former passes through the former to the die for extrusion via the die, and pumping inclusions of multiple thin patterns of material, particularly a fat-based material, of texture different from that of the ice confectionery through an assembly of a hollow spindle with nozzle(s), which extend transversely from the spindle, attached wherein the nozzle(s) is (are) provided with ports, particularly slots, for delivering the material into the ice confectionery composition stream in the former, and wherein the spindle is located and extends along and about an axis of the former within the ice confectionery stream and rotates about the axis and also translates axially in a reciprocating movement so that thin patterns of the material are formed in the ice confectionery to obtain a composite product having material inclusion zones and inclusion-free zones, and the composite product so-pumped is extruded via the die, preferably vertically downwards, to provide a strand which has a cross-section given by the die outlet opening, and then the strand is cut to provide slabs.

For clarity, one can consider the former to be the length where inclusions are deposited. The die typically is relatively short and defines the final product footprint.

The apparatus according to the present invention comprises:
- a former with a supply for aerated ice composition, provided with an extrusion die through which a stream of aerated ice composition outflows as a strand, wherein the cross-section of the strand is given by the shape of the extrusion die,
- an assembly of a hollow spindle with nozzle(s) attached, which nozzle(s) is provided with slot(s), and wherein the spindle and nozzle(s) assembly is located on the center axis of the former,
- means for rotating and translating axially the assembly in a reciprocating movement within the ice confection stream flowing in the former,
- means for supplying inclusion material through the spindle and nozzle(s) assembly through a rotary joint from a lateral inlet in a pulsed mode for forming thin patterns of inclusion and inclusion-free zones and
- means for cutting the strand laterally in the inclusion-free zones into slabs.

In an embodiment, the apparatus may further be comprised of zones where it is heated with the intent of reducing the friction along the walls of the former and to assist in maintaining a planar patterning and this is one of several options to achieve planar flow.

DETAILED DESCRIPTION OF THE INVENTION

In the context of the present invention, the aerated ice confectionery is an aerated ice composition, for example an aerated ice cream, sherbet or sorbet or ice yogurt having a soft texture. The confectionery composition flowing through the former may consist of distinct ice cream, sherbet or sorbet of different colour and perfumes which may be co-extruded and may contain syrups or sauces or small inclusion particles so as to produce a composite or marbled or spotted body of substantially soft texture.

The description of the inclusion material as being a "material of texture different from that of aerated ice confectionery" applies to a fat-based or water-based composition or an emulsion or dispersion, preferably a crispy composition at ice composition temperature. The fat may be a vegetable butter, such as cocoa butter, a cocoa butter substitute or equivalent, more particularly a fat-based coating of the type commonly used in confectionery. It may also be a water-based or sugar-containing composition, such as a syrup or sauce or cooked sugar. A fat-based, water-based or sugar-containing composition may contain flavourings or colourants. The composition should be liquid and have good spreading properties at nozzle outlet, so that it may be applied from the nozzle slotted outlet in the form of a thin pattern solidifying in contact with the cold aerated ice confectionery.

The expression "slot" means that the outlet orifice of the nozzle is distinctly more elongate than wide. It is not necessarily parallel, e.g. it may be non-parallel, with a width decreasing toward its end which is away from the spindle.

"Thin inclusion patterns", as used here, is defined as multiple inclusion patterns in the range of 0.3 to 2 mm thickness.

The spindle and nozzle assembly may have single or multiple ports and single or multiple slots, delivering one or more materials of the same or different nature.

Assembly components are designed and operated in such a manner to create a variety of inclusion pattern deposits as required by the specific product. To facilitate cutting, thin patterns are produced that are approximately parallel to the cutting plane.

Separately, or in connection with pattern orientation, pulsing may be used to minimize inclusion in the cutting plane of a conventional wire cutter. In order to create an inclusion-free zone, the nozzle is moved rapidly in a reciprocating motion along the spindle axis as it rotates. The rapid axial motion of the nozzle, hereinafter referred to as "pulsing", causes segmentation of the inclusion in the ice confectionery stream. Vibrated energy in the form of work, rather than heat, which is transferred to the inclusion flowing through the spindle and nozzle assembly, makes it possible to maintain flow without plugging with lower heat input in the form of lower inclusion temperature and/or inclusion flow rate. A conventional hot wire cutter is then used to cut through the inclusion-free zones by synchronizing the nozzle position with the cutter. Multiple inclusions may also be produced.

A spindle conducts inclusion ingredients to single or multiple nozzles, with single or multiple nozzle ports. The spindle may be driven at a constant rotational speed, or may be rotated in quadrature, or rotated within quadrature alternately in a clockwise and counter-clockwise fashion. Constant speed rotation in one direction, typically opposite the motion of the inclusion exiting the nozzle, produces continuous inclusion patterns. Discontinuous rotation will produce segments of inclusions oriented about the axis of the spindle, for example, allowance for stick insertion, 165–195 degrees, chocolate patterns between 195–305 degrees, vanilla patterns between 305–55 degrees, and strawberry patterns between 55–165 degrees.

Stepping and servo-controlled motors may be used to produce a variety of combinations of axial and rotational motions of the spindle and nozzle to create specific geometric patterns. Motors of this type can be programmed to produce a variety of patterns with minimal changes in the physical hardware, e.g. by nozzle replacement and nozzle orientation.

The spindle may be articulated about a point along its axis in order to make patterns in non-circular formers, e.g. by means of a flexible joint.

The method of the invention allows, in addition, introducing patterns into water ice products.

The invention is described in more detail by way of example in the following with reference to the accompanying drawings, wherein the arrangement of extrusion shown preferably is vertical. However, there should be no presumption that the arrangement of extrusion needs to be vertical. The strand can be either extruded horizontally, inclined toward the horizontal or vertically extruded.

BRIEF DESCRIPTION OF THE DRAWING FIGURES

FIG. 1 schematically illustrates the apparatus and a stickbar product made, partly in cross-sectional view.

FIG. 2 schematically illustrates an alternative embodiment of the apparatus with a two-port spindle, partly in cross-sectional view.

FIG. 3 is a cross-sectional view along line 3—3 of FIG. 1 of a one-port spindle.

FIG. 4 is a cross-sectional view along line 3—3 of FIG. 1 of a three-port spindle.

Figure 6:
Figure 7:
Figure 8:
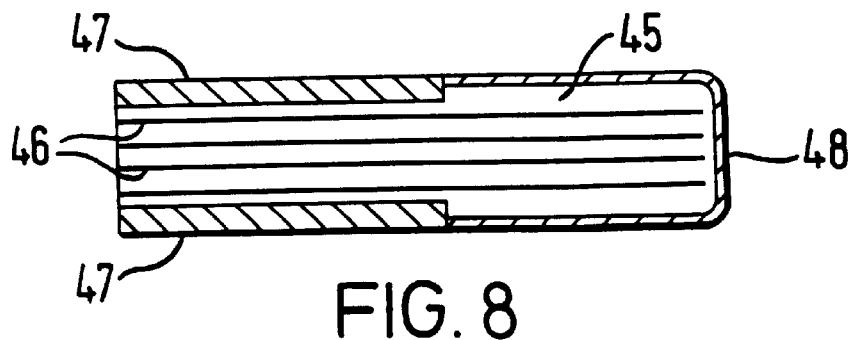

FIG. 6 is a detailed front view of a single port nozzle.
FIG. 7 is a detailed front view of a dual port nozzle.
FIG. 8 is a schematical representation of an alternative stickless sandwich product.

DETAILED DESCRIPTION OF THE DRAWING FIGURES AND ILLUSTRATIVE OPERATIONAL EXAMPLES

Figure 1:
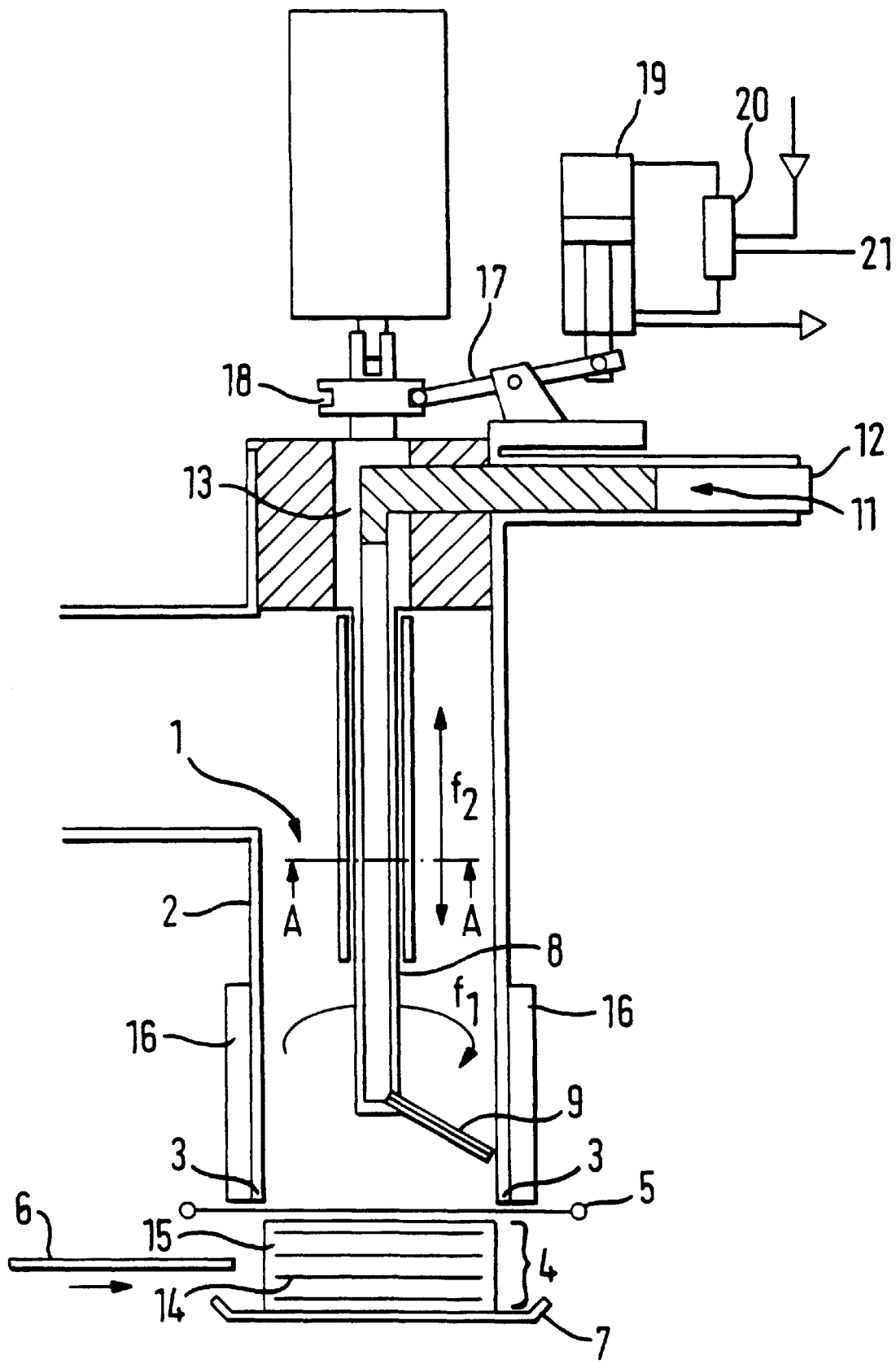

Referring to FIG. 1, aerated ice cream mix 1 was pumped into the former 2. In an extrusion line, the former shaped the cross-section of the product depending on the shape of the extrusion die 3, a slab 4 being cut out of the extruded strand by means of a conventional hot wire cutter 5. A stick 6 was inserted laterally into the cut slab 4, the cutter timing determining the thickness of the product, and the product was evacuated for further processing by the underlaying plate conveyor 7. Further processing, which is not represented, means travelling the sticked slab through a cooling tunnel, enrobing the cooled article with a confectionery coating and wrapping the coated stick-bar in a flow-pack operation.

A spindle 8 with single nozzle 9 (FIG. 4) or multiple nozzles 10 (FIG. 7) attached at an angle of about 60° to the axis of the spindle, was located on the center axis of the former 2. In an operation for preparing a product, the spindle and nozzle assembly rotated clockwise in the direction of the arrow f1 and translated axially within the ice cream stream flowing in the former in a reciprocating motion along the arrow f2. Pumpable inclusion ingredients, such as chocolate-based composition 11 were pumped into the ice cream stream via the rotated and translated spindle and nozzle assembly from the inlet 12 through the rotary joint 13. Inclusion material under pump head pressure exited the nozzle 9 into the ice cream stream forming thin patterns. The velocity of moving components and of the inclusion material and of the ice cream determined the resulting pattern 14 of inclusion in the ice cream, which, as illustrated in FIG. 1, provides a plurality of layers of the edible material 14 and each layer is separated one from another and completely surrounded by the ice confectionery composition 15.

The geometric pattern of the inclusion in the ice cream was determined mainly by the velocity of the ice cream stream, the radial motion of the spindle, the axial motion of the spindle, the orientation of the nozzle relative to the transverse plane, the angle of the nozzle relative to the former centerline, the exit velocity profile of the inclusion at the nozzle, the exit velocity profile along the longitudinal axis of the nozzle, the temperature of the inclusion at the nozzle exit, the solidification rate of the inclusion after exiting the nozzle, the configuration of the nozzle (entrance and exit geometry, slots details, length to width ratio), and the distance of the nozzle to former walls.

Inclusion-free segments or zones in the inclusion pattern formed were generated by pulsing the spindle axially in a reciprocal motion as the spindle was rotated. The spindle may be rotated at a constant speed or may be rotated at non-constant speeds and directions using a stepping motor (not shown) as dictated by the product requirements. Pulsing in the axial direction results in creation of inclusion-free zones due to rapid translation of the nozzle. This created a segmented inclusion which permits use of conventional cutting methods.

The typical motion for a bar product was the rapid movement of the nozzle counter to the ice cream flow to create the inclusion-free zone 15. Immediately thereafter, the nozzle was translated axially co-current with the ice cream flow at a velocity slightly greater than that of the ice cream stream. This created distinct inclusion patterning in the product located between inclusion-free zones. The velocity difference between the axial motions of the spindle and ice cream determined the length of the inclusion zone. The inclusion zone was limited to the total time to produce one bar, less the time allotted to produce the inclusion-free zone. To avoid friction along the inside walls of the former and to assist in producing planar patterns, heated zones 16 were provided along the outside of the former.

The cutter 5 was synchronized with the inclusion-free zone such that the cutter passed through the product in a location, which was inclusion-free. The pulse profile was dictated by the product specifications. The pulse profile was the timeposition relationship, which established the zones of inclusion and inclusion-free zones. Hence, the pulse profile was dictated by several factors including: the lengths of the inclusion and the inclusion-free zones required, the volume needed for stick insertion whenever applicable, the cutting rate of the product and the inclusion characteristics (e.g. the freezing temperature).

In the embodiment shown, axial pulsing was achieved by means of a cam 17 and follower 18 driven by a double acting air actuator 19 acting on cam 17. The air actuator 19 was driven by a double solenoid valve 20 which was in turn driven by two timers 21 in series. However, any reliable and sanitary means of driving the spindle axially and in rotation may be used.

In particular, a servo-controlled unit can be used which has the advantage of yielding greater flexibility than mechanical control means. The rotation of spindle and axial motion are thus independently programmable.

Pulsing may also be modulated, e.g. vibrated at high frequency to enhance nozzle performance, e.g. to minimize plugging. This would serve to increase the envelope of operability in terms of lower inclusion temperatures, lower flow rates, and use of a broad spectrum of recipes and ingredients.

The pattern established at the nozzle location may be altered by subsequent changes in the former cross-section, depending on the outer shape of the article, which may be e.g. rounded, rectangular or oval. Non-planar pattern due to change in cross-section may be corrected by nozzle angle to spindle axis. The effects of changes in cross-section and flow profile in the former are countered by changing the nozzle geometry, e.g. orientating the nozzle at an angle of about 60° to about 90° to the direction of ice cream flow and/or by zone heating the former. Also the axis of the spindle and nozzle assembly may be driven eccentrically, or the nozzle may be provided with a motion control articulation, e.g. through a flexible joint within the former whilst rotating, e.g. the spindle and nozzle assembly may be provided with suitable cam means in order to allow the nozzle to scan a big part of the die cross-section in the case that it is not circular, e.g. of rounded rectangular or oval shape.

As shown in FIG. 2, hollow spindle 8 has two ports providing a dual fluid nozzle 22,23. Spindle 8 comprises a central tube 24 connected to a first pumpable inclusion fluid inlet 25 trough a rotary joint 26 and an outer coaxial tube 27 surrounding tube 24 and connected to a second pumpable inclusion fluid inlet 28 trough a rotary joint 29. Between tube 27 and an exterior tube 30, which is preferably made of a low thermal conductivity plastic material, an air gap is provided in the form of a sheath 31. A foil of thermally conducting material 32, e.g. a resistance heater is provided for locally heating the inclusion fluids to avoid friction against the internal wall of the spindle which is in contact with the cold ice confectionery stream 1.

In operation of the embodiment of FIG. 2, axial pulsing along arrow f2 was achieved by means of a mating adapter 33 to drive a ball screw assembly (not shown) and with the aid of a bearing 34 for spindle 8. In this way, spindle 8 can be driven axially and in rotation by a motor (not shown). In operation, the different fluids were sealed one from another by seals 35, 36 and 37.

Figure 5:
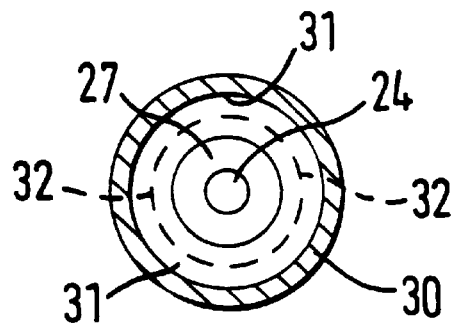
FIG. 5 is a cross-sectional view along line 5—5 of FIG. 2 of a two-port spindle.

As shown in FIG. 3, 4 and 5, the cross-section of spindle 8 comprises a low thermal conductivity fluted plastic core 38 with one port 39 (FIG. 3), a low thermal conductivity plastic exterior tube 30 with two interior tubes forming two ports 24, 27 (FIG. 5) or a low thermal conductivity fluted plastic core 38 with three ports 40 (FIG. 4), e.g. for placing multiple ingredients as inclusions simultaneously, pressed into sheath 41, e.g., a stainless steel sheath. The fluted core 38 was supported at three points to minimize contact between the plastic core 38 and the sheath 41, and provided an air gap 42 that may also be evacuated to further reduce heat transfer. In the embodiment of FIG. 5, an air gap is also provided in the form of a sheath 31 between the interior tube 27 and the exterior tube 30. Other thermal isolation methods may also be used, e.g. aerogel, vacuum, to thermally isolate inclusion fluid(s) from the ice cream.

As represented in FIGS. 6 and 7, respectively, the nozzle 9 has one slot 43, and the nozzle 10 has two slots 44. Likewise, nozzles 22 and 23 (FIG. 2) may have one or two slots.

In FIG. 8, the product illustrated consists of a core of ice cream 45 with patterned inclusions of chocolate 46 sandwiched between wafers or biscuit layers 47 which cover only partly the upper and lower surfaces, the remainder of the surfaces being enrobed with a chocolate coating 48 or which covered the whole upper and lower ice cream surfaces (embodiment not shown).

In a typical example of production of a stick-bar, the spindle 8 was driven at 100–200 rpm with reciprocal pulsing and high frequency vibration, the nozzle was inclined at an angle of 60° to the vertical, the width of the slot(s) of the nozzle was 0.6–1.2 mm (0.025–0.05") with a length to width ratio of 22–44, the pressure of inclusion material was 1.5–3 bar (20–40 psi), the inlet temperature of inclusion material was <30° C. (<85° F.) and the weight ratio of inclusion to bar was 5–10%, which produced 100–200 layers/min with one port in the spindle and one slot in the nozzle, 200–400 layers/min with one port/two slots and 400–800 layers/min with two ports/two slots. Due to proper thermal insulation of the spindle, there was no nozzle plugging.

The product had >2–3 transverse well distinct substantially parallel patterns of 0.6–1.2 mm (0.025–0.05") of nearly constant geometry-thinness and shape with layering from the center to the periphery of the cross-section. In particular, high mixing rates at the center, which would result in lack of defined patterns at the center, of the product and "doughnut" shaped layers with highly mixed centers was completely avoided. The bars could be cut with clean transverse cut without post-cutter flow of inclusion being observed. An outflow of inclusion from the shaped bar, when it is cut to length would be quite detrimental since it would result in plate sticking, the plates being very difficult to clean. Furthermore, stick insertion was without interference, which is of advantage, since obstructed stick insertion would result in damage to the bar or in misplaced/displaced sticks and resultant product losses.

What is claimed is:
1. The patterned ice confectionery product prepared by a process comprising the steps of:
pumping an extrudable ice confectionery composition into a former structure which comprises a die for extruding a shaped product from the former structure and pumping an edible inclusion material, which is selected from the group consisting of a fat-based composition a water-based composition and a sugar syrup composition, via a hollowed spindle and nozzle assembly, wherein the assembly extends within the former structure so that a hollowed spindle extends longitudinally towards the die about an axis of the former structure and a nozzle member extends, with respect to the axis, from the spindle transversely, to a nozzle port opening and so that the assembly is surrounded by ice confectionery composition pumped through the former structure so that the inclusion material is pumped via the nozzle port opening to within the pumped ice confectionery composition, and rotating the assembly about the axis and reciprocating the assembly along the axis so that the inclusion material pumped from the nozzle port opening is distributed to within the pumped ice confectionery composition pumped through the former structure to the die to obtain a composite product pumped to the die and so that the composite product has zones of the ice confectionery which separate and completely surround a plurality of planar inclusion material zones which consist essentially of the inclusion material so that there are ice confectionery composition zones which are free of the inclusion material and which separate and completely surround the planar inclusion material zones and extruding the so-pumped composite product via the die to obtain a composite product strand from the die wherein the ice confectionery zones separate and completely surround the planar inclusion material zones; and
synchronizing the reciprocating and a strand cutting means and cutting through the strand so that the cutting is through a zone of the product strand which is free of the edible inclusion material so that composite product portions which have a plurality of planar inclusion material zones separated one from another and completely surrounded by the ice confectionery zones are obtained.
2. The product prepared according to the process of claim 1 wherein, in operation, the process comprises rotating the assembly continuously.
3. The product prepared according to the process of claim 1 wherein, in operation, the process comprises rotating the assembly discontinuously.
4. The product prepared according to the process of claim 1 wherein the nozzle port opening is a slot having a size so that the inclusion material layers have a thickness of from 0.3 mm to 2 mm.
5. The product prepared according to the process of claim 1 wherein there are a plurality of nozzles which extend from the spindle for pumping the inclusion material to within the pumped ice confectionery composition composition.
6. The product prepared according to the process of claim 1 wherein the ice confectionery composition is selected from the group consisting of an ice cream, a sherbert, a sorbet and an ice yogurt.
7. The product prepared according to the process of claim 1 wherein the ice confectionery composition is a water-ice composition.

8. The product prepared according to the process of claim 1 or 6 or 7 wherein the inclusion material is a sugar-containing composition.

9. The product prepared according to the process of claim 1 or 6 wherein the inclusion material is a vegetable butter.

10. The product prepared according to the process of claim 1 or 6 wherein the inclusion material is selected from the group consisting of cocoa butter and a cocoa butter substitute.

11. The product prepared according to the process of claim 1 wherein the ice confectionery composition is an aerated composition.

12. The product prepared according to the process of claim 1 wherein the process further comprises applying a fat-based confectionery material to a composite material portion so prepared to enrobe the portion with the fat-based confectionery material.

13. The product prepared according to the process of claim 1 wherein the process further comprises inserting a stick into a composite material portion so prepared.

14. The product prepared according to the process of claim 1 wherein the process further comprises inserting a stick into a composite product material portion so prepared and into a zone of the portion which is free of the inclusion material.

15. A patterned composite food product comprising an ice confectionery composition component and an edible inclusion material component which differs from the ice confectionery composition wherein the product has a pattern form comprised of a plurality of planar inclusion material layers separated one from another and completely surrounded by the ice confectionery composition and wherein the inclusion material layers consist essentially of a material selected from the group consisting of a fat-based composition, a water-based composition and a sugar syrup composition.

16. The patterned product according to claim 15 wherein the ice confectionery composition is selected from the group consisting of an ice cream, a sherbert, a sorbet and an ice yogurt.

17. The patterned product according to claim 15 wherein the ice confectionery composition is a water-ice composition.

18. The patterned product according to claim 15 or 16 wherein the inclusion material is a vegetable butter.

19. The patterned product according to claim 15 or 16 wherein the inclusion material is selected from the group consisting of cocoa butter and a cocoa butter substitute.

20. The patterned product according to claim 15 wherein the ice confectionery composition is an aerated composition.

21. The patterned product according to claim 15 further comprising a fat-based confectionery material which enrobes the product.

22. The patterned product according to claim 15 further comprising a stick positioned within and extending from the product.

23. The patterned product according to claim 22 wherein the stick is positioned within the product in a zone which is free of the inclusion material.

* * * * *